United States Patent
Yamamoto et al.

(10) Patent No.: US 6,659,860 B1
(45) Date of Patent: Dec. 9, 2003

(54) GAME DEVICE, GAME MACHINE OPERATION DEVICE AND GAME SYSTEM WHICH EMPLOY A HALF-DUPLEX SERIAL COMMUNICATION SYSTEM AND GAME DEVICE TWO-WAY COMMUNICATION METHOD

(75) Inventors: Yasuyuki Yamamoto, Tokyo (JP); Hideaki Io, Tokyo (JP); Makoto Tanaka, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/303,580

(22) Filed: May 3, 1999

(30) Foreign Application Priority Data

May 12, 1998 (JP) .......................................... P10-129264

(51) Int. Cl.[7] .......................... A63F 13/00; A63F 9/24; G06F 17/00; G06F 19/00
(52) U.S. Cl. ........................ 463/1; 463/2; 463/5; 463/7; 463/36; 463/37; 463/38; 463/40; 463/41; 463/43; 273/148 R; 273/453; 273/454; 273/455; 710/105; 710/107; 710/313
(58) Field of Search ............................... 463/41, 5, 1, 2, 463/29, 7, 35, 36, 37, 38, 39, 40, 42, 43; 710/105, 107, 106, 112, 118, 125, 313; 273/453, 454, 455, 148 R

(56) References Cited

U.S. PATENT DOCUMENTS

| | | | | |
|---|---|---|---|---|
| 4,186,379 A | * | 1/1980 | Knoblock et al. ...... 340/146.1 R X |
| 4,841,295 A | * | 6/1989 | Delaney et al. .......... 340/825.5 |
| 4,882,474 A | * | 11/1989 | Anderl et al. ........... 235/380 X |
| 5,396,225 A | * | 3/1995 | Okada et al. ........ 340/825.21 X |
| 5,592,609 A | * | 1/1997 | Suzuki et al. ........... 395/173 X |
| 5,599,231 A | * | 2/1997 | Hibino et al. ............. 463/29 X |
| 5,602,750 A | * | 2/1997 | Severt et al. ........... 364/481 X |
| 5,619,361 A | * | 4/1997 | Sagesaka et al. ....... 359/172 X |
| 5,710,911 A | * | 1/1998 | Walsh et al. ............ 395/555 X |
| 5,712,860 A | * | 1/1998 | Hardin ..................... 371/32 X |
| 5,729,547 A | * | 3/1998 | Dute ....................... 370/447 X |
| 5,793,415 A | * | 8/1998 | Gregory, III et al. ..... 348/15 X |
| 5,795,224 A | * | 8/1998 | Yoshida ..................... 463/2 X |
| 5,961,386 A | * | 10/1999 | Sawaguchi ................ 463/43 X |
| 6,001,017 A | * | 12/1999 | Okano et al. ............. 463/43 X |
| 6,061,746 A | * | 5/2000 | Stanley et al. ........... 710/10 X |
| 6,115,771 A | * | 9/2000 | Born ..................... 710/129 X |
| 6,171,187 B1 | * | 1/2001 | Audebert et al. ......... 463/37 X |

FOREIGN PATENT DOCUMENTS

EP 0 685 246 12/1995

* cited by examiner

*Primary Examiner*—Teresa Walberg
*Assistant Examiner*—Binh-An D. Nguyen
(74) *Attorney, Agent, or Firm*—Katten Muchin Zavis Rosenman

(57) ABSTRACT

In a game system such as a television game system, a television game machine main unit includes a protocol controller and each game operation device connected to the television game machine main unit via a serial port also has a protocol controller. The television game machine main unit when connected to a game operation device which has a unique identifier, combines a communication protocol that transmits and receives data for each character with a communication protocol which transmits or receives data for two or more characters in a row and switches the communication protocol which corresponds to that game operation device based on the identifier thereof to minimize the amount of information required between the television game machine main unit and the game operation device.

19 Claims, 11 Drawing Sheets

GAME DEVICE, GAME MACHINE OPERATION DEVICE AND GAME SYSTEM WHICH EMPLOY A HALF-DUPLEX SERIAL COMMUNICATION SYSTEM AND GAME DEVICE TWO-WAY COMMUNICATION METHOD

This invention relates to a game device, a game machine operation device, a game system, and a game device two-way communication method, which for example, are suitable for a video game system.

BACKGROUND OF THE INVENTION

Heretofore there have been video game systems in which controllers as operation means are connected to a video game machine main unit, and the game proceeds by the users manipulating the controllers. Video game systems adopt a fill-duplex communication system as their system for communication between the television game machine main unit and the controllers, and they transmit and receive data simultaneously. In this case, the television game system employs a handshaking method whereby when data is to be transmitted or received, first, agreement is reached concerning the protocol of the speed or format, etc. by which the data is to be transmitted and received, and data is transmitted and received based on this agreement.

In an interactive application such as a television game system, in order to improve the sense of immediacy of operation by the user, it is important that the operation information input through the controller be quickly reflected in the sound and images of the television game machine. Generally, in a television game machine, operation information from the controller is acquired while one image frame is being scanned on the monitor, and the image for the next frame is generated based on this operation information. Therefore in a television game machine, in order to improve the picture quality with limited computational capacity, the time for acquiring operation information from the controller must be kept as short as possible, and the time for generating a one-frame image must be set as long as possible.

Meanwhile, depending on the application that is to be used, sometimes multiple controllers are connected to the television game machine. Also, sometimes a controller is used not just for inputting digital data such as a simple on/off switch, but for inputting an analog signal via a joystick in order, for example, to specify a desired spot on the display. Moreover, the controller is sometimes also used to provide feedback information to the user, such as impact or vibration. This all has tended to increase the communication time between the television game machine main unit and the controllers in television game systems.

However, a television game system must shorten the communication time in order to improve the picture quality, as mentioned above. One way to realize such shortening of the communication time would be to increase a data transfer rate between the television game machine main unit and the controller. However, in a television game system, simply increasing the transfer rate will also increase the so-called unwanted radiation that is produced from the cable that connects the television game main unit machine with the controller. Available as communication systems that prevent an increase in such unwanted radiation are the low-voltage difference signal (LVDS) communication system, the double shielded line communication system, the optical fiber communication system, and the infrared communication system. Among these, what are effective are LVDS communication systems in which the number of signal lines is reduced and the shielding is strengthened, such as, for example, USB (universal serial bus) or IEEE 1394 (the Institute of Electrical and Electronic Engineers 1394).

When the number of cable signal lines in a television game system is thus reduced, full-duplex communication or synchronous communication, or efficient communication employing control lines, becomes difficult, so there is no other alternative but to carry out all data transmission and reception or communication control with a half-duplex communication system. Therefore, for example with the USB, when data is to be transmitted or received, and transmission and reception are done separately, first a protocol is established for the speed and format by which the data shall be transmitted and received, then the data is transmitted and received based on this protocol.

In such a television game system, if the volume of data communication to be transferred after establishment of the protocol is large, the volume of data communication required for establishing the protocol (the so-called overhead) will be smaller than the volume of data communication to be transferred, and can be ignored. However, in a video game system, the volume of data communication to be transferred between the television game machine main unit and the game controllers is smaller than the volume of data communication to be transferred if a computer peripheral device, printer, speaker, modem, etc. are connected to the television game machine main unit. Thus a television game system requires, in addition to the volume of data communication to be transferred after the protocol is established, an overhead involving a large volume of communication, and as a result, the problem arises that the communication time increases.

SUMMARY OF THE INVENTION

It is an object of the present invention to provide a game device, game machine operation device, a game system, and a game device two-way communication method which can transmit and receive data at a higher speed than conventional devices of the type under consideration.

This and other objects of this invention are attained by a game device that employs a half-duplex serial communication system as its system of communication with game machine operation devices connected via a serial port, and which comprises means for combining, based on the identifiers of said game machine operation devices supplied from each game machine operation device, a communication protocol that transmits and receives data for each single character with a communication protocol that transmits or receives data for two or more characters in a row, and it switches the communication protocol to a communication protocol that corresponds to the game machine operation device.

By combining a communication protocol that transmits and receives data for each single character and a communication protocol that transmits or receives data for two or more characters in a row, and switching the communication protocol to the communication protocol that corresponds to the game machine operation device, the amount of communication required between the game device and the game machine operation devices can be minimized to a greater extent than in the case of simply transmitting and receiving data for each single character as previously.

Also, in the present invention, a game machine operation device is proposed, which employs a half-duplex serial communication system as its system of communication with a game device to which it is connected via a serial port, and which has an identifier that is unique to said game machine operation device, and comprising means for providing the identifier to the game device when said game machine operation device is connected to said game device, to cause the game device to combine a communication protocol that transmits and receives data for each single character and a communication protocol that transmits or receives data for two or more characters in a row, and to switch the communication protocol to the communication protocol that corresponds to said game machine operation device.

By combining a communication protocol that transmits and receives data for each single character and a communication protocol that transmits or receives data for two or more characters in a row, and switching the communication protocol to the communication protocol that corresponds to the game machine operation device, the amount of communication required between the game device and the game machine operation devices can be minimized to a greater extent than in the case of simply transmitting and receiving data for each single character as previously.

Also, according to this invention, a game system is provided, in which a game device and game machine operation devices are connected via a serial port and that employs a half-duplex serial communication system as its system of communication between said game device and game machine operation devices, wherein the game device combines, based on the identifiers of said game machine operation devices supplied from the game machine operation devices, a communication protocol that transmits and receives data for each single character with a communication protocol that transmits or receives data for two or more characters in a row, and switches the communication protocol to the communication protocol that corresponds to the game machine operation device, and game machine operation devices that each have an identifier that is unique to the game machine operation device and give the identifier to the game device when the game machine operation device is connected to the game device.

By combining a communication protocol that transmits and receives data for each single character and a communication protocol that transmits or receives data for two or more characters in a row, and switching the communication protocol to the communication protocol that corresponds to the game machine operation device, the amount of communication required between the game device and the game machine operation devices can be minimized to a greater extent than in the case of simply transmitting and receiving data for each single character as previously.

Also, according to the invention, a game device two-way communication method is provided, that employs a half-duplex serial communication system as its system of communication with game machine operation devices connected via a serial port, and based on the identifiers of said game machine operation devices supplied from the game machine operation devices, it combines a communication protocol that transmits and receives data for each single character and a communication protocol that transmits or receives data for two or more characters in a row, and switches the communication protocol to a communication protocol that corresponds to the game machine operation device.

By combining a communication protocol that transmits and receives data for each single character and a communication protocol that transmits or receives data for two or more characters in a row, and switching the communication protocol to the communication protocol that corresponds to the game machine operation device, the amount of communication required between the game device and the game machine operation devices can be minimized to a greater extent than in the case of simply transmitting and receiving data for each single character as previously.

DETAILED DESCRIPTION OF THE PREFERRED EMBODIMENTS

Figure 1:
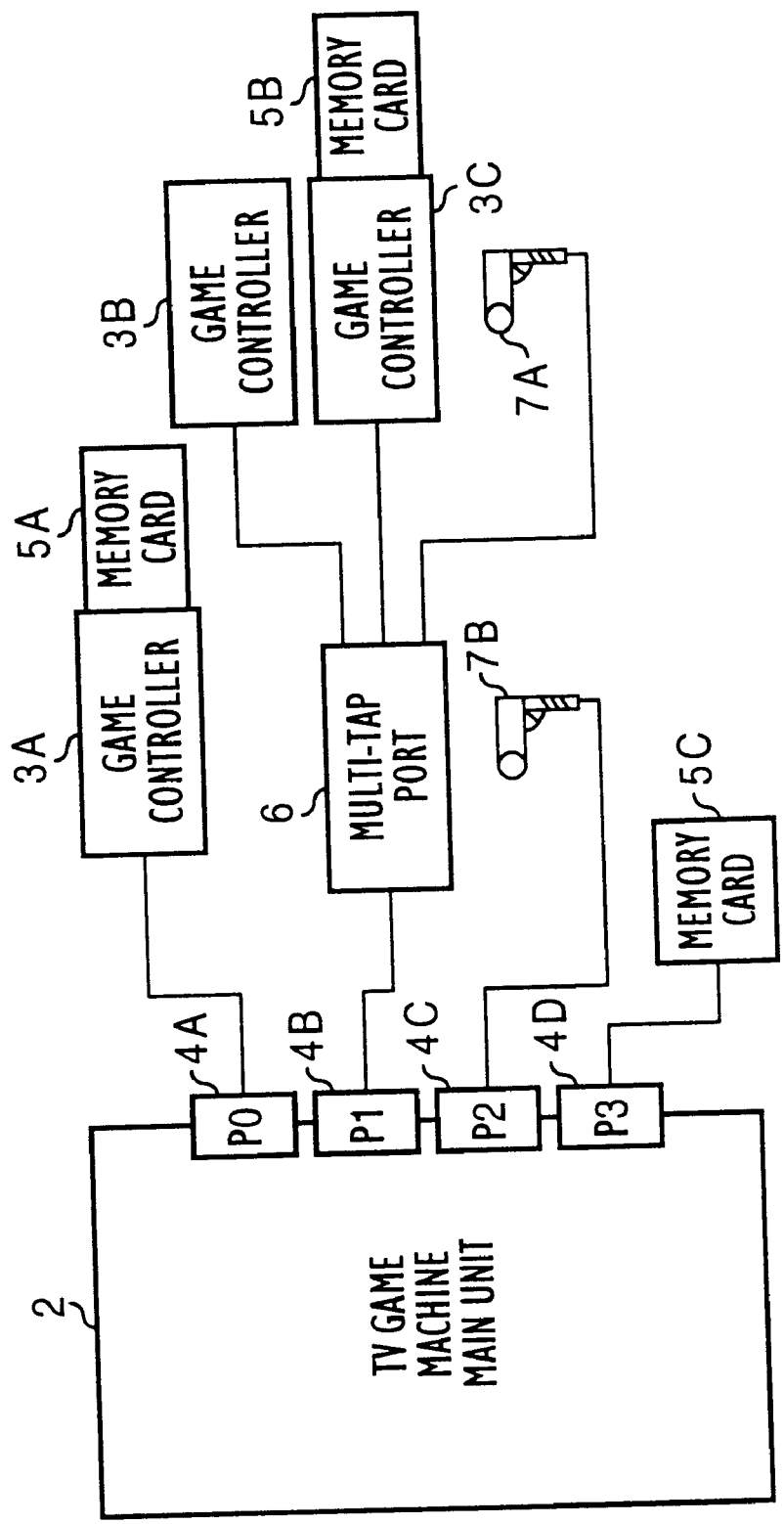
FIG. 1 is a block diagram showing the configuration of a television game system according to an embodiment of the invention.

In FIG. 1, 1 designates a television game system as a whole. The television game system includes a television game machine main unit 2 and game machine operation devices (game controllers) 3A–3C, which input commands to the television game machine main unit 2 in accordance with the content of the game and the progress of the game. Television game machine main unit 2 has controller ports 4A–4D, which are serial ports, as an interface with external peripheral devices, and the desired peripheral devices can be connected.

Connected to controller port 4A is game controller 3A, and operation information corresponding to operations by the user is transmitted to television game machine main unit 2 via controller port 4A. Connected to game controller 3A is a memory card 5A, which can store the desired game information (for example, if the game is interrupted before it has ended, the state of its progress thus far).

Connected to controller port 4B is a multi-tap port 6 for expanding the controller port 4B. Connected to the multi-tap port 6 are game controllers 3B and 3C, and connected to game controller 3C is a memory card 5B. Also connected to multi-tap port 6 is a lightpen-type gun controller 7A. When a trigger formed on gun controller 7A is pulled, it appears to hit what is on the screen of television game machine main unit 2 where the tip of gun controller 7A is aimed. Connected to controller port 4C is a gun controller 7B, and connected to controller port 4D is a memory card 5C.

Thus television game machine main unit 2 can execute application software, such as games, while carrying out data communication with multiple peripheral devices connected via controller ports 4A–4D. By connecting multiple game controllers 3A–3C and gun controllers 7A and 7B to television game machine main unit 2, for example, interactive games can be played by multiple users.

Figure 2:
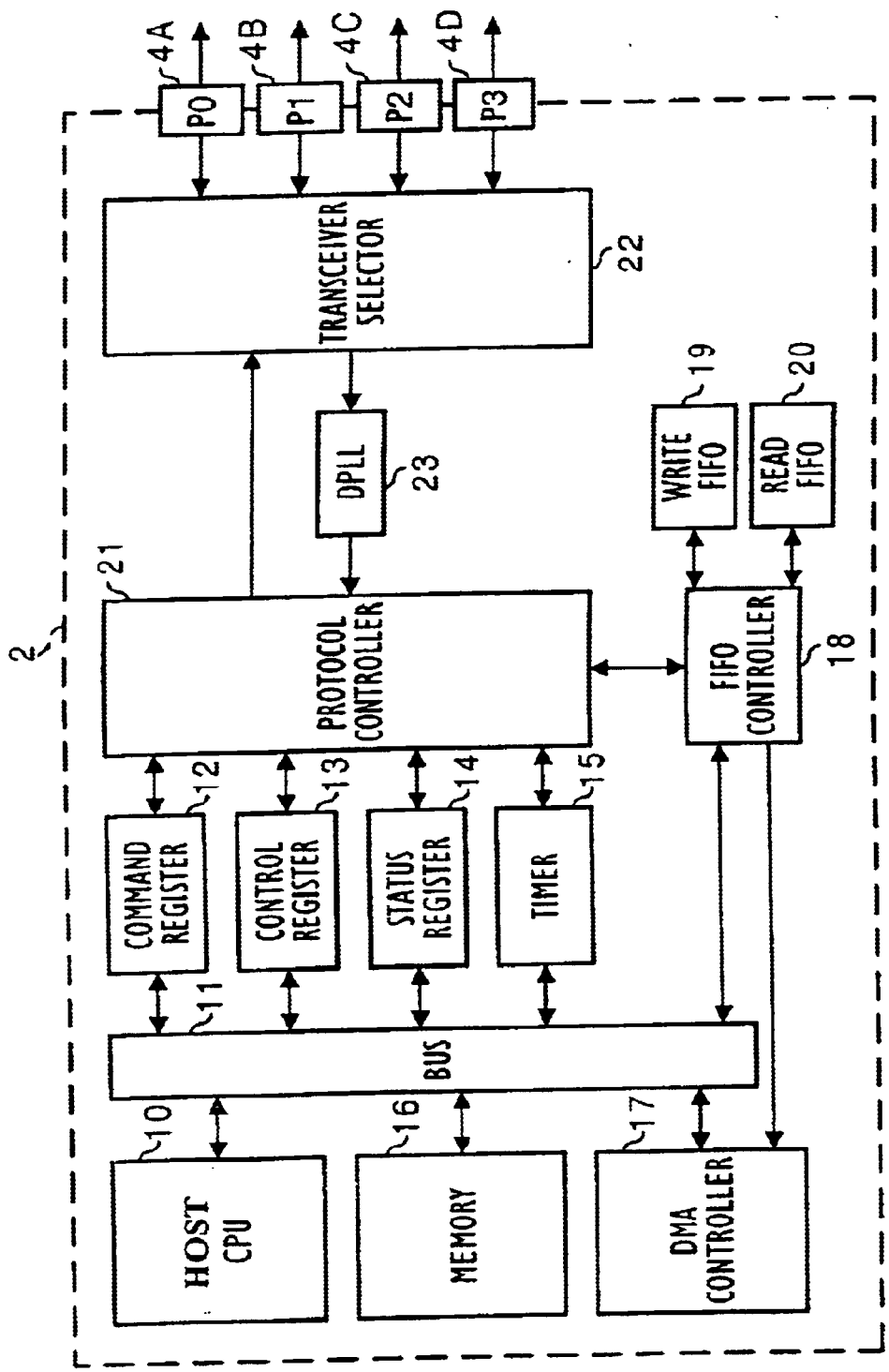
FIG. 2 is a block diagram showing the configuration of a television game machine main unit of the system of FIG. 1.

FIG. 2 shows a block diagram of television game machine main unit 2. Host CPU 10, which manages the entire television game machine main unit 2, controls each block via bus 11. By checking the peripheral devices connected to controller ports 4A–4D, host CPU 10 decides the communication mode corresponding to the peripheral devices. Then host CPU 10 transfers the communication mode information based on the decided communication mode to a command register 12 via bus 11, and the communication mode is set by writing the communication mode information into command register 12.

Also, host CPU 10 transfers to control register 13, via bus 11, serial communication information that indicates the conditions for serial communication, and the serial communication is set and the actual serial communication is begun by writing the serial communication information into control register 13. Meanwhile, status register 14 holds the current communication state. Therefore host CPU 10 confirms the current communication state by accessing status register 14 via bus 11. Timer 15 performs communication timing control. In this way, host CPU 10 adjusts the communication interval, etc. by accessing timer 15 via bus 11.

Memory 16 is connected to bus 11 and stores the data to be communicated. DMA (direct memory access) controller 17 likewise is connected to bus 11. The DMA (direct memory access) controller 17 is controlled by FIFO (first-in first-out) controller 18; based on a DMA request from the FIFO controller 18, data is transferred between memory 16 and write FIFO 19 as well as memory 16 and read FIFO 20 while bypassing host CPU 10.

FIFO controller 18 controls the reading and writing of data to and from write FIFO 19 and read FIFO 20. Write FIFO 19 temporarily holds the data to be transmitted to game controller 3A (FIG. 1), while read FIFO 20 temporarily holds the data received from game controller 3A (FIG. 1).

Protocol controller 21, which is connected to command register 12, control register 13, status register 14, timer 15, FIFO controller 18, and transceiver selector 22, controls the flow of data to be transmitted and received. Transceiver selector 22, at the time of transmission, format-converts the serial signal to a differential signal, selects the desired controller port 4 from among controller ports 4A–4D, and transmits the differential signal via controller port 4 to game controller 3 connected to controller port 4. At the time of reception, on the other hand, transceiver selector 22 receives the differential signal transmitted from desired game controller 3 among game controllers 3A–3C via controller port 4 that corresponds to said game controller 3. And transceiver selector 22 converts this received differential signal to a serial signal and outputs it to DPLL 23. DPLL 23 corrects the reception timing of the serial signal and outputs it to protocol controller 21.

Incidentally, if controller CPU 30 (refer to FIG. 3) has a slow execution speed, protocol controller 21 is such that the receivable waiting time is set long. From the fact that the receivable waiting time is set in accordance with the communication mode, protocol controller 21 can check whether the game controller 3A is performing efficient transmission.

Figure 3:
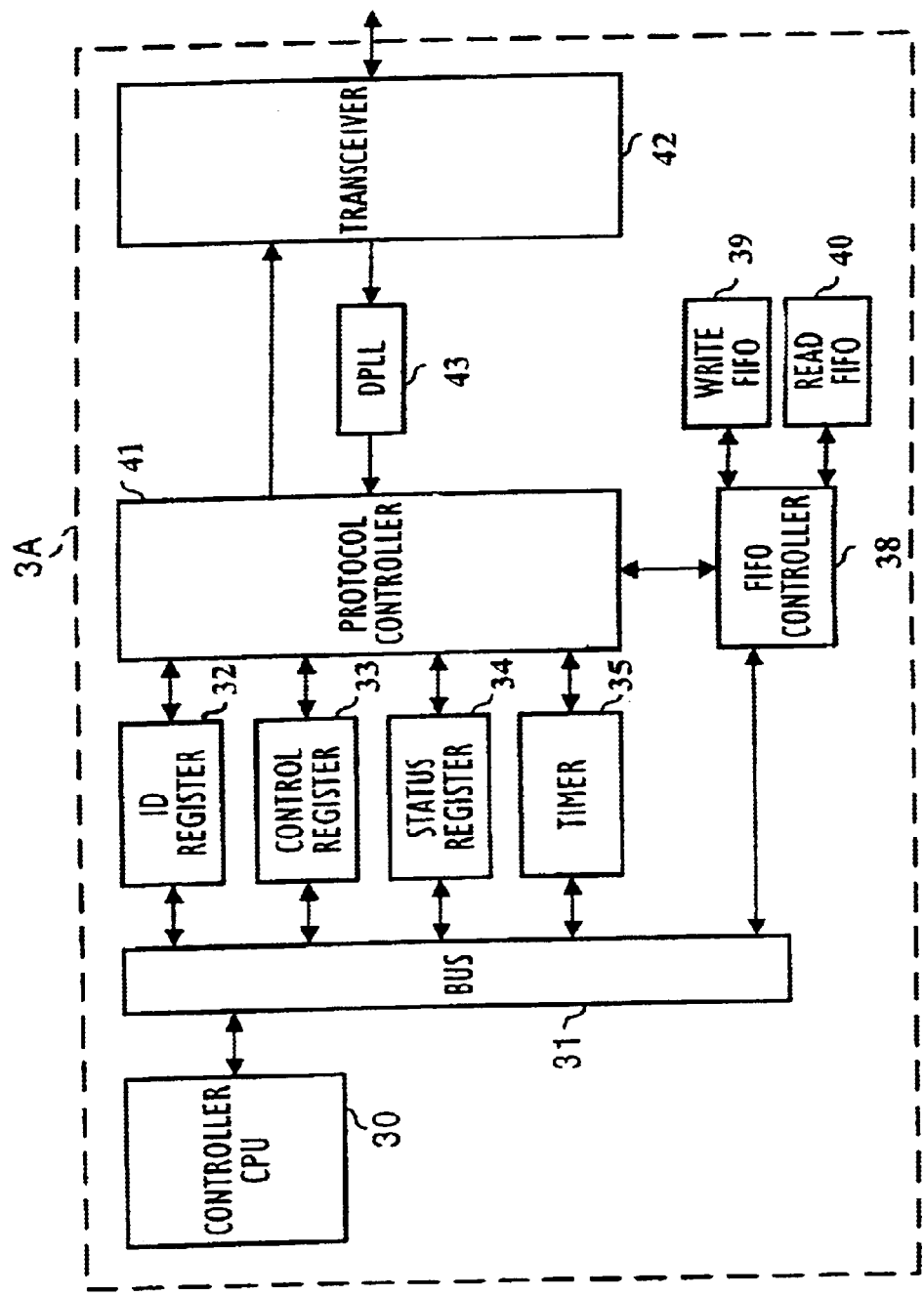
FIG. 3 is a block diagram showing the configuration of a game controller of the system of FIG. 1.

FIG. 3 shows in detail game controller 3A. Game controllers 3A–3C are all constructed in the same way, so only the configuration of game controller 3A will be described in detail. As shown in FIG. 3, game controller 3A has the same configuration as television game machine main unit 2, except for the configuration of controller CPU 30, bus 31, FIFO controller 38, transceiver 42, and ID register 32.

Controller CPU 30, which manages the entire game controller 3A, controls each block via bus 31. By accessing ID register 32 via bus 31, controller CPU 30 writes into ID register 32 and sets the identification (ID=identification) number, which is unique to game controller 3A and is a condition for transmission and reception, and the category class.

Because game controller 3A does not have a DMA controller as television game machine main unit 2 does, there is no need to generate a DMA request in FIFO controller 38. Also, game controller 3A does not have controller ports 4A–4D as television game machine main unit 2 does. Thus transceiver 42 need only convert a serial signal to a differential signal at the time of transmission, and convert a differential signal to a serial signal at the time of reception.

With game controller 3A, if the storage capacity of read FIFO 40 is small and the number of characters of data to be transmitted is large, then the loss of data received on the television game machine main unit 2 side is prevented by setting the transmission interval long.

Figure 4:
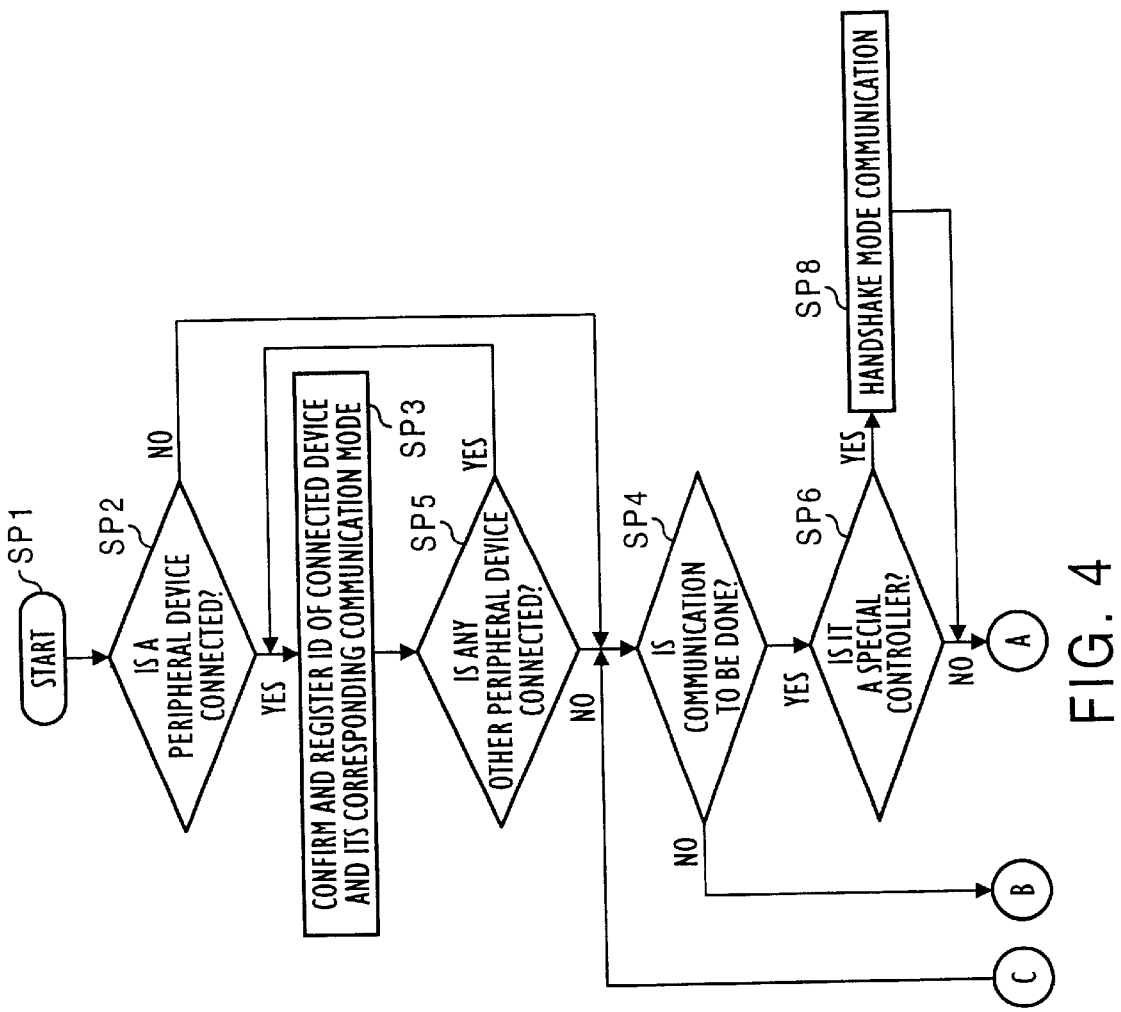
FIGS. 4 and 5 show a flowchart of the two-way communication method of the television game machine main unit of the system of FIG. 1.
Figure 5:
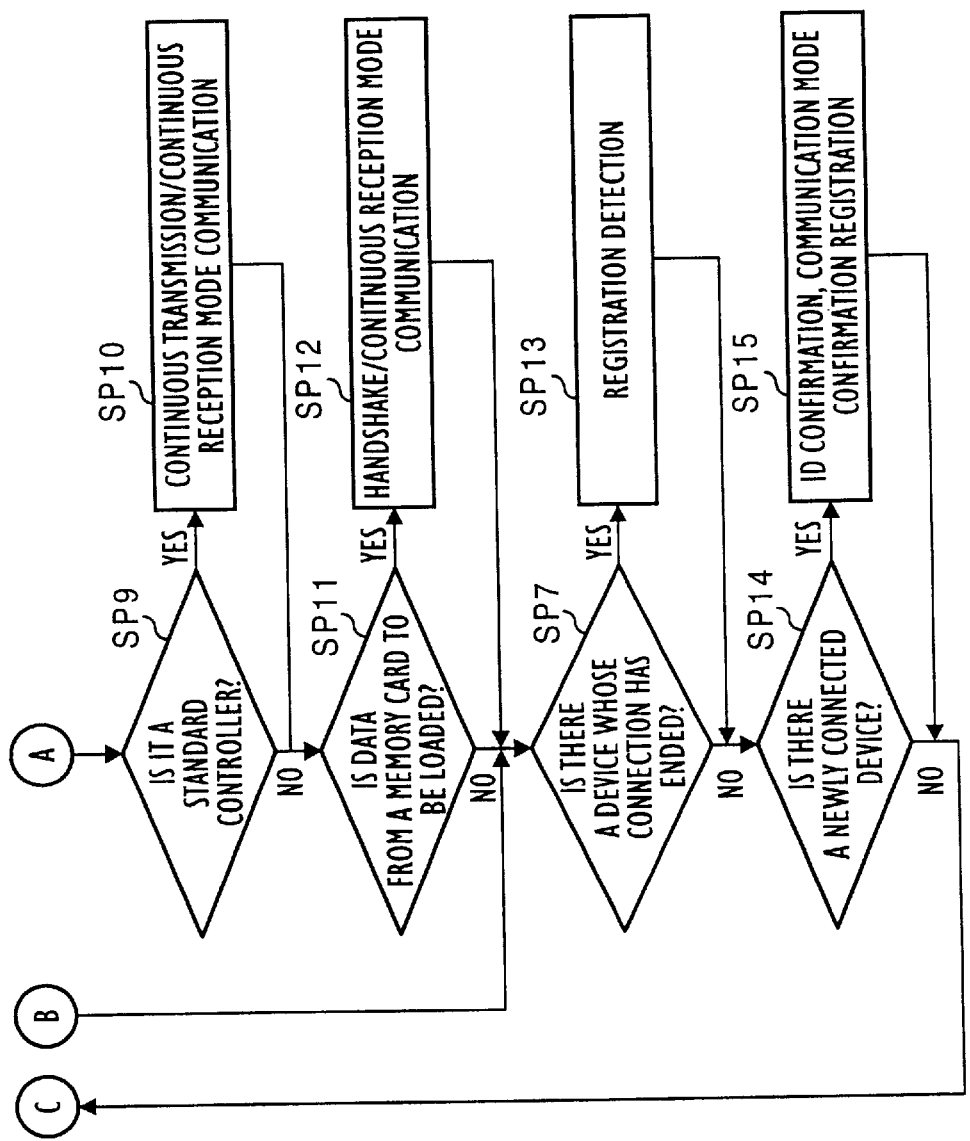

FIGS. 4 and 5 show a flowchart of the two-way communication method of the television game machine main unit 2. First, in step SP2, which is entered from step SP1, the television game machine main unit 2 decides whether peripheral devices are connected to controller parts 4A–4D; if it decides that peripheral devices are connected, it proceeds to step SP3; if it decides that peripheral devices are not connected, it proceeds to step SP4. In step SP3, television game machine main unit 2 confirms and registers the ID number of the connected peripheral device and the communication mode corresponding to that ID number.

In step SP5, television game machine main unit 2 decides whether any other peripheral device is connected; if it decides that a peripheral device is connected, it returns to step SP3 and repeats the operation; if it decides that one is not connected, it proceeds to step SP4. Television game machine main unit 2 communicates with the connected peripheral devices as necessary in accordance with the progress of the game. In step SP4, television game machine main unit 2 decides whether it is time to communicate with a peripheral device; if it decides that communication is to be done, it proceeds to step SP6; if it decides that no communication is to be done, it proceeds to step SP7.

In step SP6, television game machine main unit 2 decides whether the connected peripheral device is a special controller, such as, for example, one that provides the user impact feedback; if it decides that it is a special controller, it proceeds to step SP8; if it decides that it is not a special controller, it proceeds to step SP9. In step SP8, television game machine main unit 2 sets the communication mode to handshake mode and proceeds to step SP9.

In step SP9, television game machine main unit 2 decides whether the connected peripheral device is a standard controller, such as, for example, one in which the data to be transmitted or received is preset; if it decides that it is a standard controller, it proceeds to step SP10; if it decides that it is not a standard controller, it proceeds to step SP11. In step SP10, television game machine main unit 2 sets the communication mode to continuous transmission/continuous reception mode and proceeds to step SP11.

In step SP11, television game machine main unit 2 decides whether data is to be read from a connected memory card; if it decides that data is to be read from a connected memory card, it proceeds to step SP12; if it decides that data is not to be read from a connected memory card, it proceeds to step SP7. In step SP12, television game machine main unit 2 sets the communication mode to handshake/continuous reception mode and proceeds to step SP7.

In step SP7, television game machine main unit 2 decides whether among the connected peripheral devices there is a device that has been removed by the user; if it decides that there is a device that has been removed, it proceeds to step SP13; if it decides that there is no device that has been removed, it proceeds to step SP14. In step SP13, television game machine main unit 2 deletes registration of the removed device and proceeds to step SP14. In step SP14, television game machine main unit 2 decides whether there is a device that has been newly connected by the user; if it decides that there is a device that has been newly connected, it proceeds to step SP15; if the television game machine unit 2 decides that there is no device that has been newly connected, it returns to step SP4 and repeats the operation. In step SP15, television game machine main unit 2 confirms the ID number and communication mode of the connected device and proceeds to step SP4.

Figure 6:
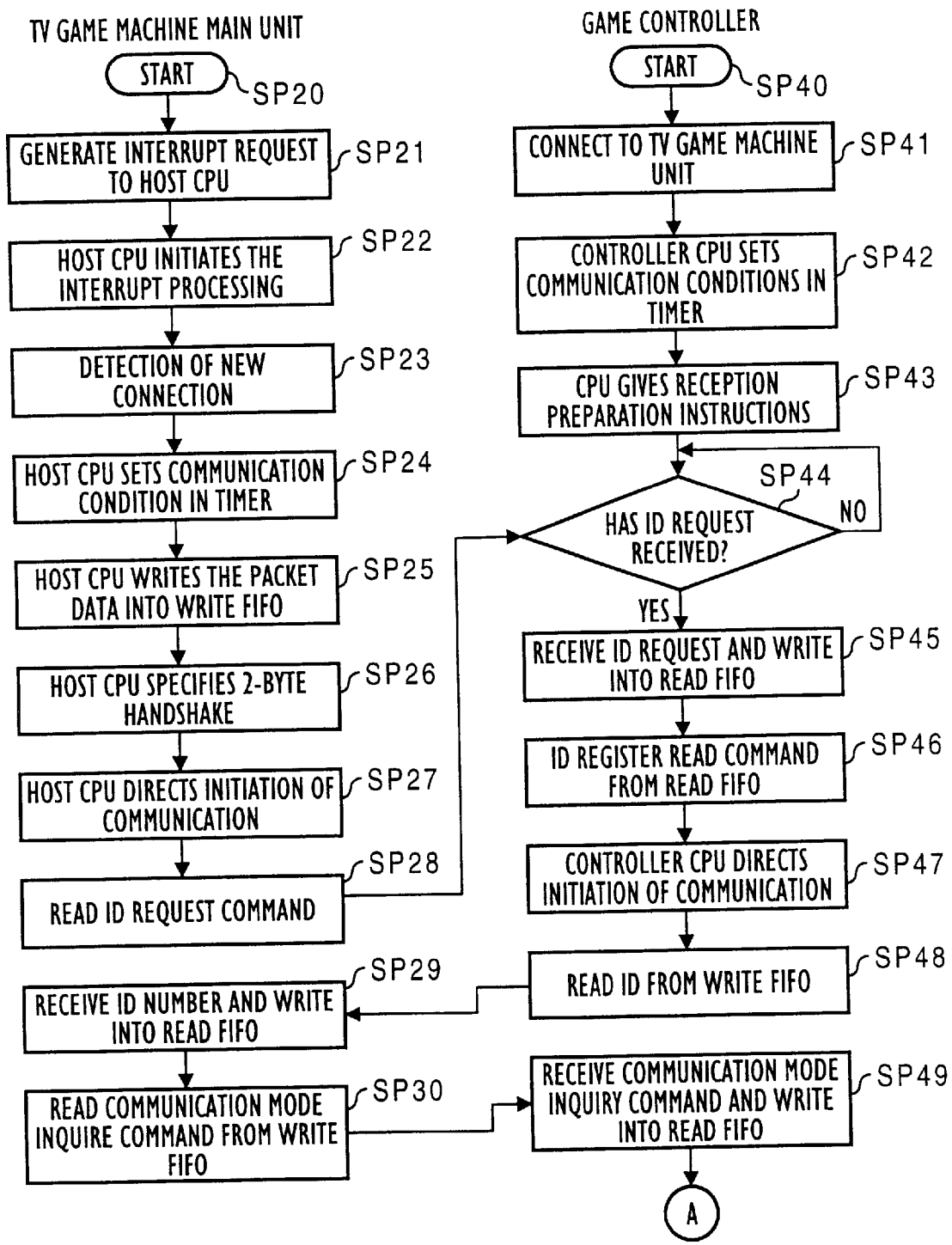
FIGS. 6 and 7 show a flowchart of the method for confirming the ID number and communication mode of a game controller.
Figure 7:
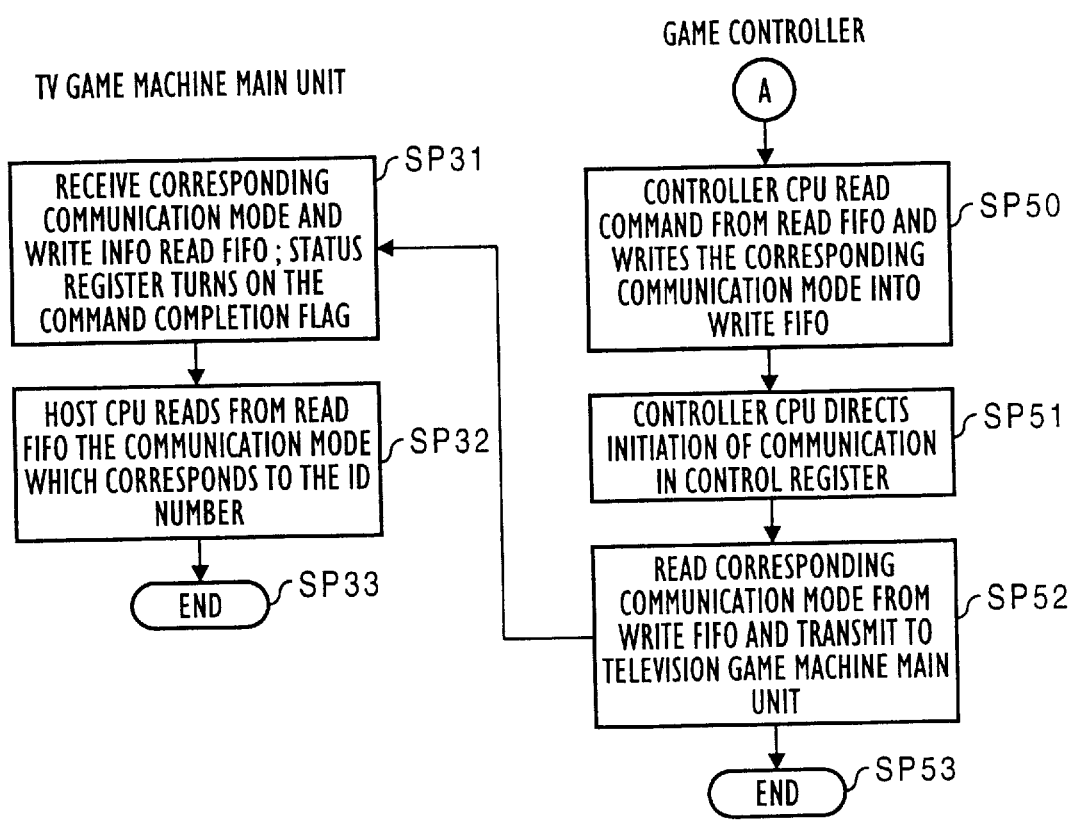

Using the flowchart shown in FIGS. 6 and 7, the specific processing procedure in the ID number and communication mode confirmation step (SP3) for game controller 3A will be now described. First the processing procedure in television game machine main unit 2 will be discussed. In step SP21, which is entered from step SP20, transceiver selector 22 notifies host CPU 10 of an interrupt request. In step SP22, host CPU 10 initiates the interrupt processing. In step SP23, controller port 4A detects that game controller 3A has been newly connected.

In step SP24, host CPU 10 notifies timer 15, via bus 11, of the conditions concerning transmission and reception timing and sets said timing conditions in timer 15. In step SP25, host CPU 10 writes into write FIFO 19 the packet data for confirming the connection, that is, a command for requesting the ID number (hereafter called an ID request command) and a command for querying the communication mode (hereafter called a communication mode inquiry command). In step SP26, host CPU 10 specifies the communication mode to two-byte handshake mode and sets this in register 12.

In step SP27, host CPU 10 directs the initiation of communication in control register 13. In step SP28, host CPU 10 reads the ID request command from write FIFO 19 and transmits it to game controller 3A via FIFO controller 18, protocol controller 21, transceiver selector 22, and controller port 4A. In step SP29, television game machine main unit 2, in response to the ID request command, sends the ID number returned from game controller 3A to read FIFO 20 via controller port 4A, transceiver selector 22, DPLL 23, protocol controller 21, and FIFO controller 18, and writes said ID number into read FIFO 20.

In step SP30, host CPU 10 reads the communication mode inquiry command from write FIFO 19 and transmits this command to game controller 3A via FIFO controller 18, protocol controller 21, transceiver selector 22, and controller port 4A. In step SP31, television game machine main unit 2, in response to the communication mode inquiry command, sends the communication mode returned from game controller 3A to read FIFO 20 via controller port 4A, transceiver selector 22, DPLL 23, protocol controller 21, and FIFO controller 18, and writes that communication mode into read FIFO 20. Status register 14 turns on a flag that indicates that the command has been completed. In step SP32, host CPU 10 reads from read FIFO 20 the communication mode that corresponds to the ID number of game controller 3A. Next, it moves to step SP33 and terminates the processing.

Next the processing procedure in game controller 3A will be described. First, in step SP41, which is entered from step SP40, game controller 3A is connected to controller port 4A of television game machine main unit 2. In step SP42, controller CPU 30 sets in timer 35 the conditions concerning transmission and reception timing. In step SP43, controller CPU 30 directs control register 33 to make preparations for reception. In step SP44, controller CPU 30 decides whether an ID request command has been received; if controller CPU30 decides that an ID request command has been received, it proceeds to step SP45; if controller CPU30 decides that it has not been received, it repeats the operation until it is received.

In step SP45, controller CPU 30 sends the ID request command received by transceiver 42 to read FIFO 40 via DPLL 43, protocol controller 41, and FIFO controller 38, and writes said ID request command into read FIFO 40. And status register 34 turns on a reception flag. In step SP46, when the ID request command is read from read FIFO 40 via FIFO controller 38, ID register 32 sends the ID number to write FIFO 39 via FIFO controller 38, and writes said ID number into write FIFO 39.

In step SP47, controller CPU 30 directs the initiation of communication in control register 33. In step SP48, controller CPU 30 reads the ID number from write FIFO 39 and transmits it to television game machine main unit 2 via FIFO controller 38, protocol controller 41, and transceiver 42.

In step SP49, when the communication mode inquiry command transmitted from television game machine main unit 2 is received by transceiver 42, controller CPU 30 sends the communication mode inquiry command to read FIFO 40 via DPLL 43, protocol controller 41, and FIFO controller 38, and writes said communication mode inquiry command into read FIFO 40. Status register 34 turns on a reception flag.

In step SP50, when the communication mode inquiry command is read from read FIFO 40 via FIFO controller 38, controller CPU 30 sends the communication mode that corresponds to the ID number to write FIFO 39 via FIFO controller 38, and writes said communication mode into write FIFO 39. In step SP51, controller CPU 30 directs the initiation of communication in control register 33. In step SP52, controller CPU 30 reads the communication mode that corresponds to the ID number from write FIFO 39 and transmits it to television game machine main unit 2 via FIFO controller 38, protocol controller 41, and transceiver 42. Next, it moves to step SP53 and terminates the processing.

Figure 8:
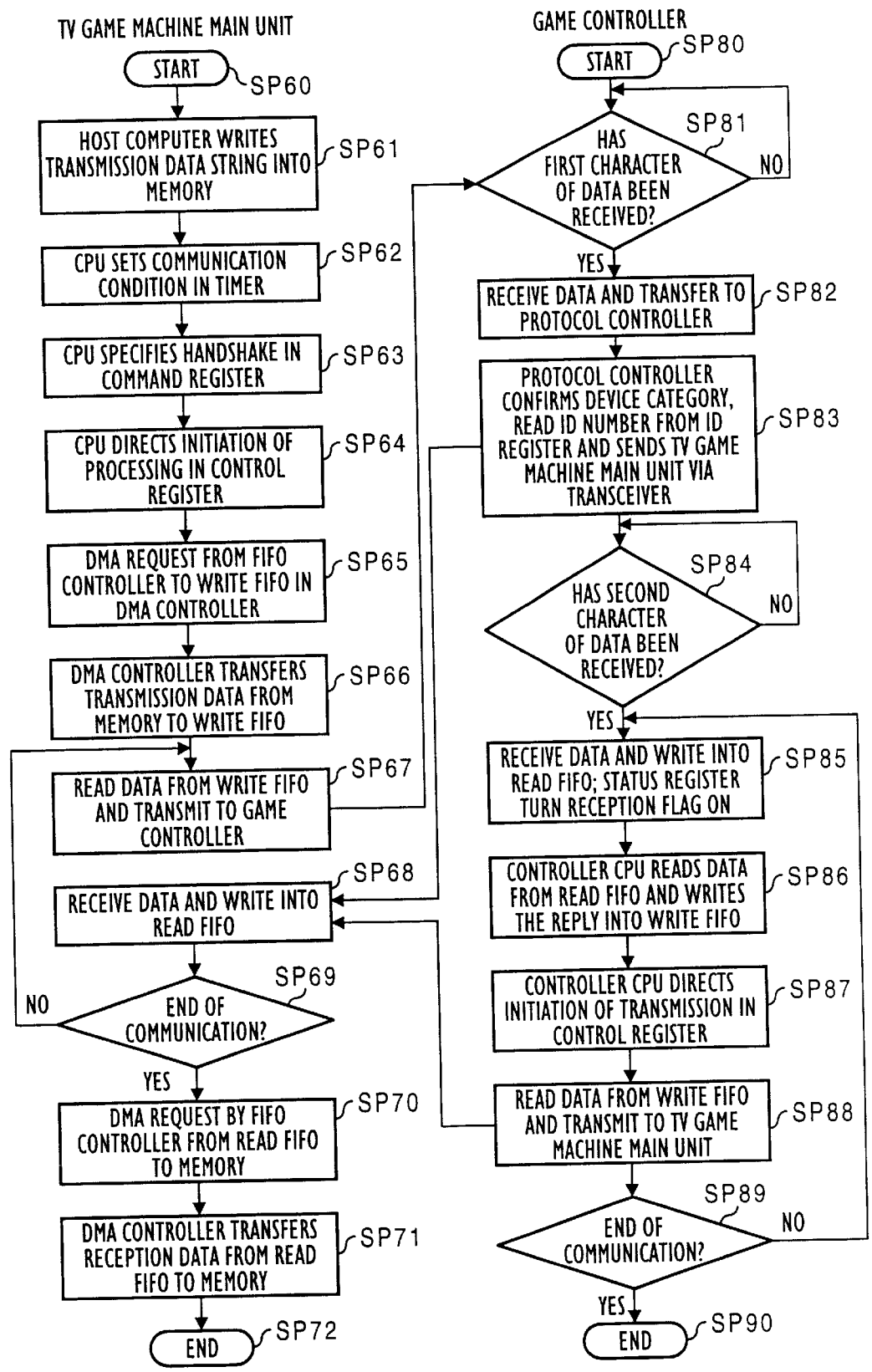
FIG. 8 is a flowchart showing a two-way communication method by handshake mode.

A two-way communication method according to a handshake mode will now be described in detail using the flowchart shown in FIG. 8. Regarding the processing procedure in television game machine main unit 2, in step SP61, which is entered from step SP60, host CPU 10 writes the transmission data into memory 16. In step SP62, host CPU 10 sets the conditions for transmission and reception timing in timer 15.

In step SP63, host CPU 10 selects the communication mode to handshake mode, writes into command register 12 that the communication mode is handshake mode, and sets in command register 12 the number of characters of the data to be transmitted. In step SP64, host CPU 10 writes the conditions for serial communication into command register 13 and directs the initiation of communication. In step SP65, FIFO controller 18 makes a DMA request to write FIFO 19 in response to DMA controller 17. In step SP66, DMA controller 17 reads the transmission data from memory 16 and writes said transmission data into write FIFO 19 by transferring it to FIFO controller 18.

In step SP67, protocol controller 21 sequentially reads, character by character, the transmission data from write FIFO 19 via FIFO controller 18, serially converts it by the timing of timer 15, sends the resulting serial signal to transceiver selector 22, and after the serial signal is converted to a differential signal by said transceiver selector 22, transmits it to game controller 3A.

In step SP68, television game machine main unit 2, in response to the transmitted differential signal, receives by transceiver selector 22 the differential signal returned from game controller 3A. Transceiver selector 22, while correcting the reception timing by DPLL 23, converts the differential signal to a serial signal and sends it to protocol controller 21. Protocol controller 21 converts the serial signal to reception data in the prescribed format, and by transferring said reception data to FIFO controller 18, the reception data is written sequentially, character by character, into read FIFO 20.

In step SP69, protocol controller 21 decides whether the number of characters of the processed transmission data matches the number of characters set in command register 12. If it decides that the number of characters processed matches the number of characters set in command register 12, it proceeds to step SP70, and if it decides that data of the number of characters set in command register 12 has not been processed, it returns to step SP67 and repeats the operation.

In step SP70, FIFO controller 18, in response to DMA controller 17, makes a DMA request from read FIFO 20 to memory 16. In step SP71, DMA controller 17 reads the reception data from read FIFO 20 via FIFO controller 18, transfers it to memory 16, and writes it into said memory 16. And because a flag is set in status register 14 that indicates that the transfer of reception data has been completed, host CPU 10, when it reads that flag from status register 14, initiates the prescribed data processing with respect to the reception data written in memory 16. Next, it moves to step SP72 and terminates the processing.

Now, the processing procedure in game controller 3A will be described. First, in step SP81, which is entered from step SP80, transceiver 42 decides whether the first character of data has been received; if it decides that the first character of data has been received, it proceeds to step SP82, and if it has not been received, it waits until it is received. In step SP82, transceiver 42 serially converts the reception data and sends it to DPLL 43. DPLL 43 corrects the reception timing of the reception data and sends it to protocol controller 41.

In step SP83, protocol controller 41 confirms whether the reception data matches the category written in ID register 32, reads the ID number of game controller 3A, serially converts it by the timing of timer 35, and sends it to transceiver 42. Transceiver 42 converts this serial signal to a differential signal and transmits it to television game machine main unit 2. In step SP84, transceiver 42 decides whether the second character of data has been received; if it decides that the second character of data has been received, it proceeds to step SP85, and if it decides that it has not yet been received, it waits until it is received.

In step SP85, game controller 3A sends the reception data to read FIFO 40 via, in succession, transceiver 42, DPLL 43, protocol controller 41, and FIFO controller 38, and writes the reception data into read FIFO 40. At this time, protocol controller 41 sets a flag in status register 34 that indicates that one character of data has been received. In step SP86, controller CPU 30, when it detects that the flag of status register 34 has changed, reads one character of reception data from read FIFO 40 via FIFO controller 38. And controller CPU 30 generates reply data for this reception data, sends this reply data to write FIFO 39 via FIFO controller 38, and writes it into said write FIFO 39. And controller CPU 30 generates reply data for this reception data, sends this reply to write FIFO 19 via FIFO controller 32, and writes it into said write FIFO 19.

In step SP87, controller CPU 30 directs the initiation of transmission in control register 33. In step SP88, protocol controller 41 reads the reply data from write FIFO 39 via FIFO controller 38 and transmits it to television game machine main unit 2 via transceiver 42. In step SP89, it is decided whether the number of characters of data received matches the number of characters set in command register 12, that is, whether data of the number of characters set in command register 12 has been processed and communication has terminated. If it is decided that the number of characters of data received matches the number of characters set in command register 12, it proceeds to step SP90 and the processing is terminated, and if it is decided that it does not match, it moves to step SP85 and repeats the operation.

Figure 9:
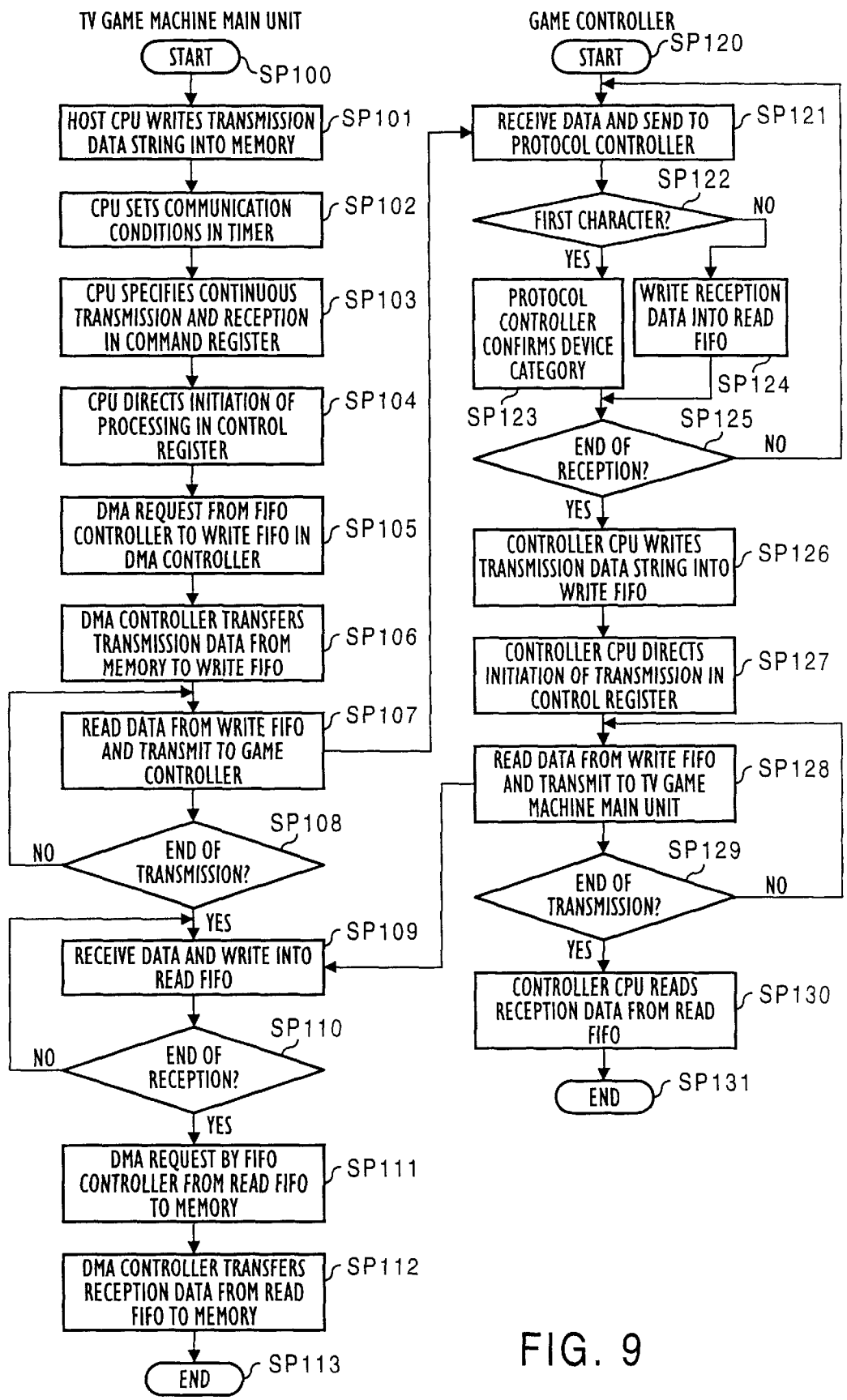
FIG. 9 is a flowchart showing a two-way communication method by continuous transmission/continuous reception mode.

The flowchart of FIG. 9, shows the specific processing procedure in the communication step according to a continuous transmission/continuous reception mode (SP10). First, the processing procedure in television game machine main unit 2 will be discussed. In step SP101, which is entered from step SP100, host CPU 10 writes the transmission data into memory 16. In step SP102, host CPU 10 sets the conditions for transmission and reception timing in timer 15.

In step SP103, host CPU 10 selects the communication mode to continuous transmission/continuous reception mode and writes in command register 12 that the communication mode is continuous transmission/continuous reception mode. Together with this, host CPU 10 sets in command register 12 the communication condition that, for example, after 4 characters of data have been transmitted, 8 characters of data will be received. In step SP104, host CPU 10 writes the conditions for serial communication into control register 13 and directs the initiation of communication.

In step SP105, FIFO controller 18 makes a DMA request to write FIFO 19 in response to DMA controller 17. In step SP106, DMA controller 17 reads 4 characters of transmission data from memory 16 and writes said transmission data into write FIFO 19 by treating this as one packet of transmission data and sequentially transferring it to FIFO controller 18. In step SP107, protocol controller 21 sequentially reads, character by character, the transmission data from write FIFO 19 via FIFO controller 18, and sequentially transmits this read-out transmission data to game controller 3A via transceiver selector 22.

In step SP108, protocol controller 21 decides whether 4 characters of transmission data have been transmitted and transmission processing has terminated; if it decides that transmission processing has terminated, it proceeds to step SP109, and if it decides that transmission has not terminated, it returns to step SP107 and repeats the operation. In step SP109, television game machine main unit 2 receives by transceiver selector 22 the data returned from game controller 3A and by sending this reception data to read FIFO 20 via DPLL 23, protocol controller 21, and FIFO controller 18, sequentially writes the reception data into read FIFO 20, character by character.

In step SP110, protocol controller 21 decides whether 8 characters of reception data have been received and reception processing has terminated; if it decides that reception processing has terminated, it proceeds to step SP111, and if it decides that reception has not terminated, it returns to step SP109 and repeats the operation. In step SP111, FIFO controller 18, in response to DMA controller 17, makes a DMA request from read FIFO 20 to memory 16.

In step SP112, DMA controller 17 reads, as one packet of reception data, 8 characters of reception data from read FIFO 20 via FIFO controller 18, transfers this to memory 16, and writes it into said memory 16. And because a flag indicating that the transfer of the reception data has terminated is set in status register 14, host CPU 10, when it reads said flag from status register 14, initiates the prescribed data processing in response to the reception data written in memory 16. Next, it moves to step SP113 and terminates the processing.

The processing procedure in game controller 3A will now be discussed. First, in step SP121, which is entered from step SP120, transceiver 42 receives, character by character, the data transmitted from television game machine main unit 2 and sequentially sends this reception data to protocol controller 41 via DPLL 43. In step SP122, protocol controller 41 decides whether the reception data is the first character; if protocol controller 41 decides that the reception data is the first character, it proceeds to step SP123, and if it is not the first character, it proceeds to step SP124.

In step SP123, protocol controller 41 confirms whether the reception data matches the category written in ID register 34. In step SP124, protocol controller 41 sends the reception data to read FIFO 40 via FIFO controller 38 and writes said reception data into read FIFO 40. At this time, protocol controller 41 sets a flag in status register 34 that indicates that one character of data has been received.

In step SP125, protocol controller 41 decides whether 4 characters of reception data have been processed and reception processing has terminated; if protocol controller 41 decides that 4 characters of reception data have been processed and reception processing has terminated, it proceeds to step SP126, and if it decides that reception has not terminated, it returns to step SP121 and repeats the operation.

In step SP126, controller CPU 30, when it detects that the flag of status register 34 has changed, reads 4 characters of reception data from read FIFO 40 via FIFO controller 38. And controller CPU 30 generates reply data for this reception data, sends this reply data to write FIFO 19 via FIFO controller 38, and writes it into said write FIFO 39.

In step SP127, controller CPU 30 directs the initiation of transmission in control register 33. In step SP128, protocol controller 41 reads the reply data from write FIFO 39 via FIFO controller 38 and transmits it to television game machine main unit 2 via transceiver 42.

In step SP129, protocol controller 41 decides whether the number of characters of data transmitted matches the number of characters set in command register 12, that is, whether 8 characters of data have been transmitted and transmission processing has terminated. If it is decided that transmission has terminated, it proceeds to step SP130, and if it is decided that it has not terminated, it returns to step SP128 and repeats the operation. In step SP130, controller CPU 30 reads the reception data from read FIFO 40 via FIFO controller 38 and performs the prescribed data processing. Next, it moves to step SP131 and terminates the processing.

Figure 10:
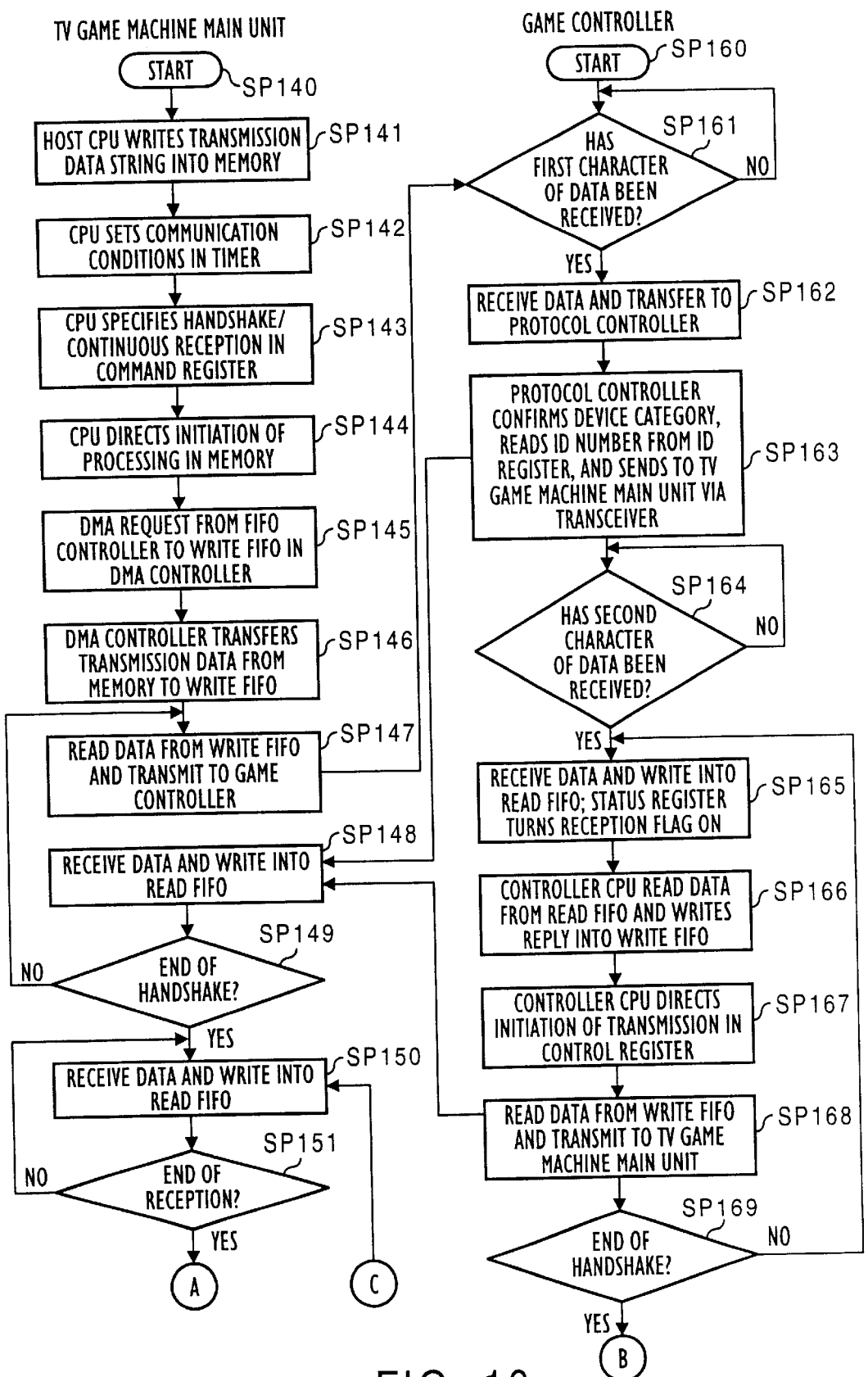
FIGS. 10 and 11 show a flowchart showing the two-way communication method by handshake/continuous reception mode.
Figure 11:
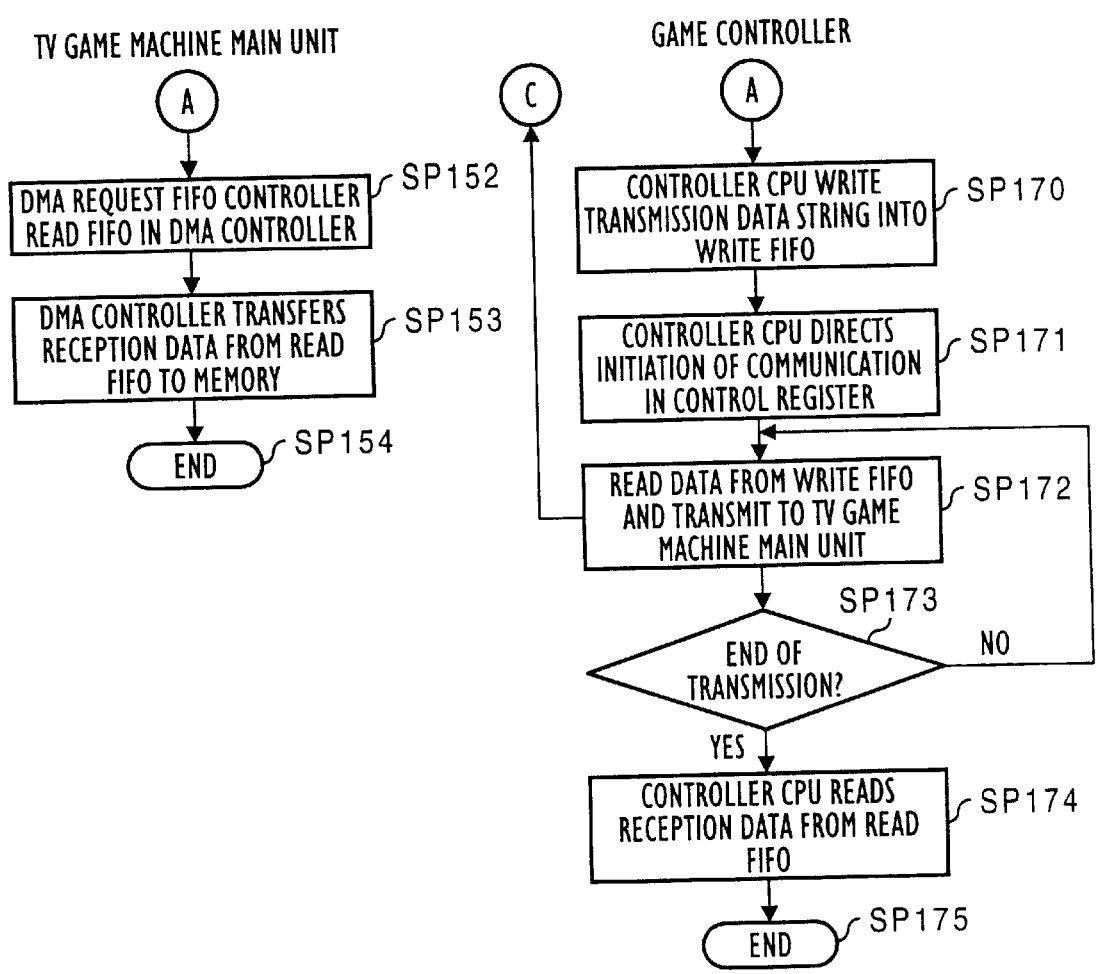

The two-way communication method according to a handshake/continuous reception mode will be discussed with reference to the flowchart of FIGS. 10 and 11, which shows the specific processing procedure in the communication step by handshake/continuous reception mode (SP12). In the processing procedure in television game machine main unit 2, in step SP141, which is entered from step SP140, host CPU 10 writes the transmission data into memory 16. In step SP142, host CPU 10 sets the conditions for transmission and reception timing in timer 15.

In step SP143, host CPU 10 selects the communication mode to handshake/continuous reception mode and writes in command register 12 that the communication mode is handshake/continuous reception mode. Simultaneously, host CPU 10 sets in command register 12 a communication condition such that after 3 characters of data have been transmitted and received, 7 characters of data in a row will be received.

In step SP144, host CPU 10 writes the conditions for serial communication into control register 13 and directs the initiation of communication. In step SP145, FIFO controller 18 makes a DMA request to write FIFO 19 in response to DMA controller 17. In step SP146, DMA controller 17 reads the transmission data from memory 16 and writes said transmission data into write FIFO 19 by transferring it to FIFO controller 18.

In step SP147, protocol controller 21 sequentially reads, character by character, the transmission data from write FIFO 19 via FIFO controller 18 and sequentially transmits said transmission data to game controller 3A via transceiver selector 22. In step SP148, television game machine main unit 2 receives at transceiver selector 22 the data returned from game controller 3A and sequentially writes the reception data into read FIFO 20 character by character, by sequentially sending this reception data via DPLL 23, protocol controller 21, FIFO controller 18, and read FIFO 20.

In step SP149, protocol controller 21 decides, based on the communication conditions set in command register 12, whether to terminate handshake mode by transmitting 3 characters of data to game controller 3A and receiving 3 characters of data from game controller 3A. If, as a result, 3 characters of data are transmitted and received and handshake mode is terminated, it proceeds to step SP150 and makes a transition to continuous reception mode, and if it is decided that 3 characters of data have not been transmitted and received, it returns to step SP147 and repeats the operation.

In step SP150, television game machine main unit 2 transfers the reception data received character by character by transceiver selector 22 to read FIFO 20 via DPLL 23, protocol controller 21, and FIFO controller 18, and sequentially writes said reception data into read FIFO 20. In step SP151, protocol controller 21 decides, based on the communication conditions set in command register 12, whether 7 characters of data have been received. If, as a result, protocol controller 21 decides to receive 7 characters of data and terminate reception processing, it proceeds to step SP152, and if it is decided that 7 characters of data have not yet been received, it returns to step SP150 and repeats the operation.

In step SP152, FIFO controller 18, in response to DMA controller 17, makes a DMA request from read FIFO 20 to memory 16. In step SP154, DMA controller 17 reads reception data from read FIFO 20 via FIFO controller 18, transfers this to memory 16, and writes it into said memory 16. Because a flag is set in status register 14 that indicates that the transfer of reception data has been completed, host CPU 10, when it reads said flag from status register 14, initiates the prescribed data processing with respect to the reception data written in memory 16. Next, it moves to step SP154 and terminates the processing.

In the processing procedure in game controller 3A, in step SP161, which is entered from step SP160, transceiver 42 decides whether the first character of data has been received; if it decides that the first character of data has been received, it proceeds to step SP162, and if it has not been received, it waits until it is received. In step SP162, transceiver 42 sends the reception data to protocol controller 41 via DPLL 43.

In step SP163, protocol controller 41 confirms whether the reception data matches the category written in ID register 32, reads the ID number of game controller 3A, and transmits it to television game machine main unit 2 via transceiver 42. In step SP164, transceiver 42 decides whether the second character of data has been received; if it decides that the second character of data has been received, it proceeds to step SP165, and if it decides that it has not yet been received, it waits until it is received.

In step SP165, game controller 3A sends the reception data to read FIFO 40 via, in succession, transceiver 42, DPLL 43, protocol controller 41, and FIFO controller 38, and writes the reception data into read FIFO 40. At this time, protocol controller 41 sets a flag in status register 34 that indicates that one character of data has been received. In step SP166, controller CPU 30, when it detects that the flag of status register 34 has changed, reads one character of reception data from read FIFO 40 via FIFO controller 38. And controller CPU 30 generates reply data for this reception data, sends this reply data to write FIFO 39 via FIFO controller 38, and writes it into said write FIFO 39.

In step SP167, controller CPU 30 directs the initiation of transmission in control register 33. In step SP168, protocol controller 41 reads the reply data from write FIFO 39 via FIFO controller 38 and transmits it to television game machine main unit 2 via transceiver 42. In step SP169, it is decided, based on the communication conditions set in control register 33, whether 3 characters of data have been received and 3 characters of data have been transmitted. If, as a result, it is decided that 3 characters have been received and transmitted and handshake mode has terminated, it moves to step SP170 and terminates the processing, and if it is decided that 3 characters of data have not been received and transmitted, it moves to step SP165 and repeats the operation.

In step SP170, controller CPU 30 generates reply data for the reception data, sends this reply data to write FIFO 39 via FIFO controller 38, and writes it into said write FIFO 39. In step SP171, controller CPU 30 directs the initiation of transmission in control register 33. In step SP172, protocol controller 41 reads the reply data from write FIFO 39 via FIFO controller 38 and transmits it to television game machine main unit 2 via transceiver 42.

In step SP173, protocol controller 41 decides whether the number of characters of data transmitted matches the number of characters set in command register 12, that is, whether 7 characters of data have been transmitted and transmission processing has terminated. If, as a result, it decides that transmission has terminated, it proceeds to step SP174, and if it decides that it has not terminated, it returns to step SP172 and repeats the operation. In step SP174, controller CPU 30 reads the reception data from read FIFO 40 via FIFO controller 38 and performs the prescribed data processing. Next, controller CPU30 moves to step SP175 and terminates the processing.

The television game system 1 as described above adopts a half-duplex serial communication system as its communication system between the television game machine main unit 2 and peripheral devices and serially transmits transmission and reception each with separate timing. In television game system 1, if a special controller is connected to television game machine main unit 2, handshake mode is selected, in which data is transmitted and received one character at a time and the content of the data is mutually confirmed. Even if such a special controller is connected, high-reliability communication can be realized by selecting handshake mode.

In television game system 1 a standard controller is connected to the television game machine main unit 2, continuous transfer mode is selected, in which two or more characters of data are continuously transmitted or received. If such a standard controller is connected, then by selecting continuous transfer mode, the transfer rate can be raised, and if the transfer direction is switched as necessary, the overhead can be reduced and the communication time can be shortened.

Moreover, in television game system 1, if a data storage means such as a memory card is connected to television game machine main unit 2, handshake/continuous transfer mode, which combines handshake mode and continuous transfer mode, is selected. If a data storage means is connected in this way, then if handshake/continuous transfer mode is selected, then, as in the case where communication is done all in handshake mode, the portion not needed for transferring unneeded dummy data, and redundant data, can be reduced, and efficient communication can be done. In doing so, redundant data is reduced by switching the communication mode, even if connected to television game machine main unit 2 via a signal line in the same way as in the case where a controller is connected.

The television game system 1 decides the content of data to be transmitted or received by a command transmitted from television game machine main unit 2, and the data to be communicated until said command is rescinded is taken as one packet. Thus the television game system 1 can do mode switching between the handshake mode and continuous transfer mode, and can switch the transfer direction of the continuous transfer mode in packet units.

Since the television game machine main unit 2 can adjust the interval by which data is to be transmitted, the communication time can be shortened. By adjusting the maximum receivable waiting time, it can be detected that a peripheral device has been removed, and peripheral devices that cannot ensure the prescribed data transfer frequency can be detected.

With the above-described configuration, by setting a desired protocol that combines the handshake mode and the continuous transfer mode in accordance with the peripheral devices connected to the television game machine main unit 2, the volume of communication between the television game machine main unit 2 and the peripheral devices can be minimized to a greater extent than in the case in which transmission and reception of data are done in the handshake mode, and thus the communication time can be made significantly shorter than previously while maintaining communication reliability.

In the above-described embodiments, the discussion concerned the case in which the mode switching is done between handshake mode and continuous transfer mode, and the transfer direction of continuous transfer mode is switched in packet units, but this invention is not limited to this; it also suffices to be able to do mode switching between handshake mode and continuous transfer mode and switch the transfer direction of continuous transfer mode within a packet.

Also, in the above-described embodiments, the discussion concerned the case in which, when data is read from a memory card, the communication mode switching is set to the handshake/continuous reception mode. However, the present invention is not limited to such case. When data is stored on a memory card, it also suffices to set the communication mode to the handshake/continuous transmission mode.

As stated above, with the present invention, by combining a communication protocol in which one character of data is transmitted and received at a time and a communication protocol in which two characters of data or more are transmitted or received continuously, and by switching the communication protocol to the communication protocol which corresponds to the game machine operation device that is connected, the volume of communication between the game device and the game machine operation devices can be minimized to a greater extent than in the previous case in which transmission and reception of data are done only one character at a time, and thus the communication time can be made significantly shorter than previously, and data can be transmitted and received at high speed, while maintaining communication reliability.

What is claimed is:

1. A game device that employs a half-duplex serial communication system as a system of communication with game machine operation devices connected via a serial port, the game device comprising:

means for combining, based on identifiers of said game machine operation devices supplied from said game machine operation devices, a communication protocol which transmits and receives data for each single character with a communication protocol which transmits or receives data for two or more characters in a row; and means for switching the communication protocol to a communication protocol that corresponds to a connected game machine operation device.

2. The game device as described in claim 1, wherein said switching means switches said communication protocols in packet units.

3. The game device as described in claim 1, wherein said switching means switches said communication protocols within a packet.

4. The game device as described in claim 1, and further comprising means for adjusting a waiting time for receiving data transmitted from said game machine operation devices.

5. The game device as described in claim 1, and further comprising means for adjusting a time interval of the data to be transmitted to said game machine operation devices.

6. A game machine operation device that employs a half-duplex serial communication system as its system of communication with a game device to which it is connected via a serial port, the game machine operation device having an identifier which is unique to said game machine operation device, and comprising means for providing said identifier to said game device when said game machine operation device is connected to said game device, to cause said game device to combine a communication protocol which transmits and receives data for each single character with a communication protocol which transmits or receives data for two or more characters in a row, and to switch the communication protocol to a communication protocol which corresponds to said game machine operation device.

7. The game machine operation device as described in claim 6, comprising means to cause said game device to switch said communication protocol in packet units.

8. The game machine operation device as described in claim 6, comprising means to cause said game device to switch said communication protocol within a packet.

9. A game system in which a game device and game machine operation devices are connected via a serial port and which employs a half-duplex serial communication system as a system of communication between said game device and game machine operation devices, the game system comprising means for combining based on identifiers of said game machine operation devices supplied from said game machine operation devices, a communication protocol which transmits and receives data for each single character with a communication protocol which transmits or receives data for two or more characters in a row, and means for switching the communication protocol to a communication protocol that corresponds to said game machine operation device, and wherein each of said game machine operation devices has an identifier which is unique to said game machine operation device, and comprises means for providing said identifier to said game device when said game machine operation device is connected to said game device.

10. The game system as described in claim 9, said switching means of said game device switches said communication protocol in packet units.

11. The game system as described in claim 9, wherein said switching means of said game device switches said communication protocol within a packet.

12. The game system as described in claim 9, wherein said game device further comprises means for adjusting a waiting time for receiving data transmitted from said game machine operation devices.

13. The game device as described in claim 9, said game device comprises means for adjusting a time interval of the data to be transmitted to said game machine operation devices.

14. The game system as described in claim 9, which is a television game system wherein said game device is a television machine main unit and said game machine operation devices are game controllers which input commands to said television game machine main unit.

15. A game device two-way communication method that employs a half-duplex serial communication system as its system of communication with game machine operation devices connected via a serial port, the two-way communication method comprising a step of combining, based on identifiers of said game machine operation devices supplied from said game machine operation devices, a communication protocol which transmits and receives data for each single character with a communication protocol which transmits or receives data for two or more characters in a row, and a step of switching the communication protocol to a communication protocol that corresponds to said game machine operation device.

16. The game device two-way communication method as described in claim 15, wherein said switching step switches said communication protocol in packet units.

17. The game device two-way communication method as described in claim 15, wherein said switching step switches said communication protocol within a packet.

18. The game device two-way communication method as described in claim 15, and further comprising a step of adjusting a waiting time for receiving data transmitted from said game machine operation devices.

19. The game device two-way communication method as described in claim 15, and further comprising a step of adjusting a time interval of the data to be transmitted to said game machine operation devices.

* * * * *